Oct. 2, 1928.
S. SAUVAGE
COOKING APPARATUS
Filed Oct. 29, 1927
1,685,829
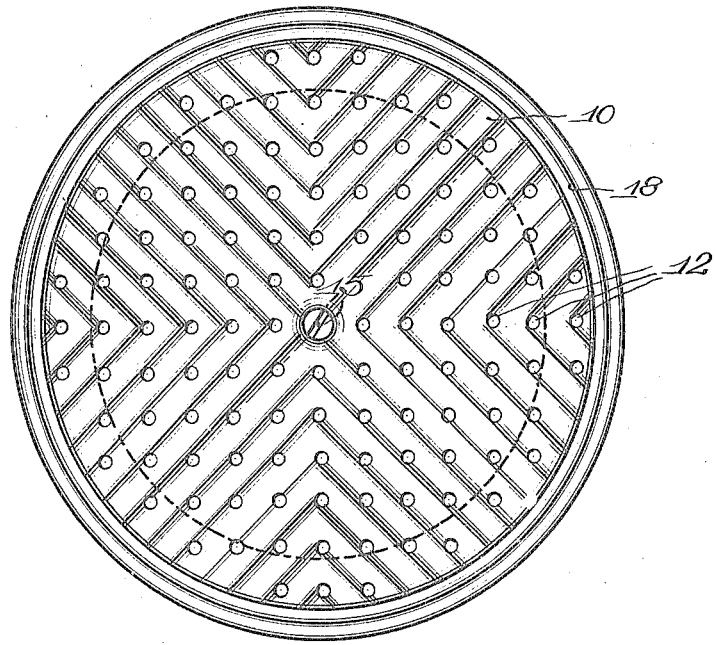
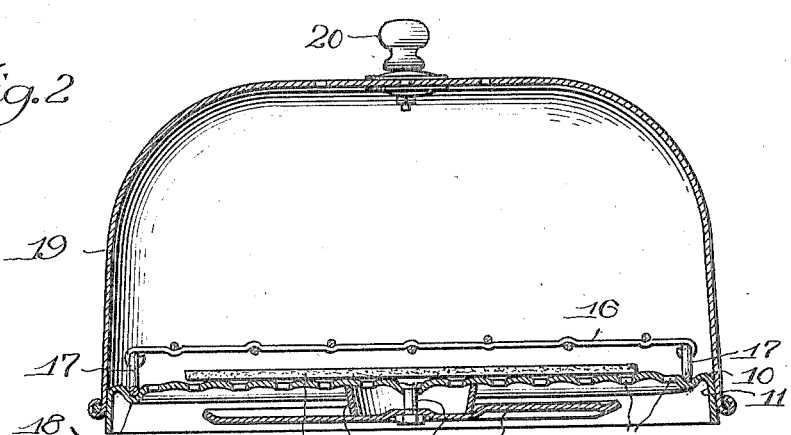
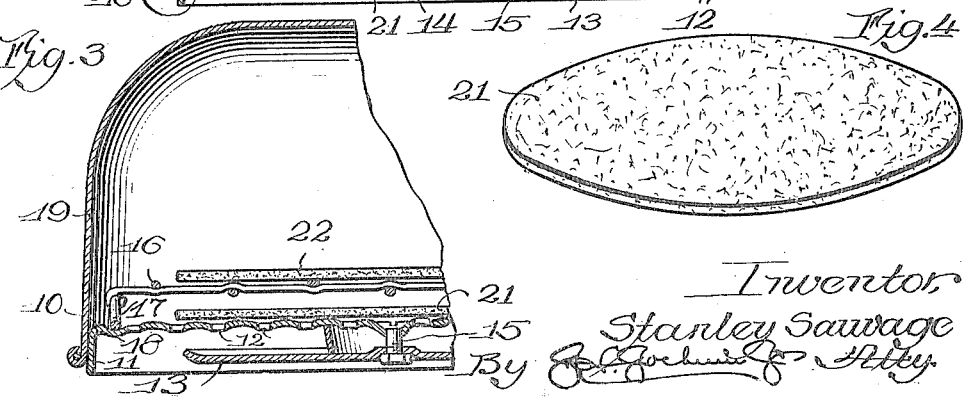
Inventor,
Stanley Sauvage Patented Oct. 2, 1928.

1,685,829

UNITED STATES PATENT OFFICE.

STANLEY SAUVAGE, OF CHICAGO, ILLINOIS.

COOKING APPARATUS.

Application filed October 29, 1927. Serial No. 229,570.

In my Patent No. 1,158,727, issued November 2, 1915, there is shown and described a heat distributor plate for use in connection with gas or vapor stoves for cooking purposes, and which plate embodies means for equally distributing the heat throughout the entire surface of the plate, the articles being supported upon the plate by means of a rack resting upon and spaced above the plate, a hood being employed for covering the article and rack whereby baking operations may be effectively performed.

It has been found, however, in use, that in baking some foods better results can be obtained if the heat is prevented from directly striking the pan or receptacle containing the article to be cooked as the article will be prevented from becoming browned too rapidly or burned on the bottom thereof.

It is therefore one of the objects of the present invention to provide improved freely insertable and removable heat non-conducting sheets or pads which may be inserted between the supply rack and the upper surface of the plate to divert the heat which would otherwise directly impinge the bottom of the pan or receptacle to the side thereof so that it will be directed by the hood on to the top of the article, or if desired an additional similar pad or sheet may be employed and placed upon the top of the rack and upon which last recited pad or sheet the pan or receptacle will rest.

The pads or sheets being freely removable and insertable it will be possible to quickly control and divert the operation of the heated air currents to adapt the apparatus to conform to the requirements best suited for cooking the different kinds of food.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which Figure 1 is a top plan view of a heat distributing plate.

Figure 2 is a vertical, longitudinal sectional view of a heating plate having a rack supported thereby and a hood covering the plate and rack, with one of the heat distributing pads in position upon the plate and beneath the rack.

Figure 3 is a view similar to Figure 2 of a portion of the plate rack and hood showing two of the heat distributing pads, one beneath the rack and upon the plate and the other supported by the rack.

Figure 4 is a detail perspective view of one of the pads or sheets.

Referring more particularly to the drawing the numeral 10 designates a plate of any desired size and configuration and constructed of any suitable material, preferably metal, the plate being provided with a downwardly projecting peripheral flange 11. The body of the plate in the present exemplification of this invention is shown as being corrugated with apertures 12 therethrough and throughout the body portion of the plate.

Arranged beneath the plate is a deflector 13 which is of a diameter considerably less than the diameter of the plate 10 and is arranged within the flange 12, the deflector 13 being preferably spaced from the plate 10 by means of a spacing member 14 and these parts are secured together by means of a suitable fastening device 15 such as a screw and nut.

Obviously the plate may be of any desired construction and the deflector 13 and spacing member 14 may be omitted if desired.

Supported by the plate 10 is an article supporting rack 16 which may be of any desired construction, but is preferably formed of wire mesh and is provided with supporting feet 17 so as to hold the rack spaced above the plate 10. If desired the plate 10 may be provided with a groove 18 extending through its upper surface and adjacent the periphery and into which groove the legs or supports 17 of the rack may enter so as to hold the rack in the proper position.

A hood 19 having a handle 20 is provided for covering the rack and the plate.

The whole apparatus is adapted to be placed upon a flame, the heated air currents and the flame striking the deflector 13 will be directed towards the end thereof so that the heated air currents will pass through the openings 12 to engage the article and also to be directed by the heat 19 back upon the article.

All of the above referred to parts are of the ordinary and well known construction.

It has been found in use that in cooking some articles which are contained in the receptacle, the heat which is directed against the bottom of the receptacle causes the bottom of the article to cook too rapidly in comparison with the rest of the article, with the result that there is a danger of the article becoming burnt on the bottom, especially when a baking operation is being performed.

In order to avoid this possibility there is provided a sheet or pad 21 constructed of any suitable heat non-conducting material, such as asbestos or the like, and this pad or sheet is of a diameter somewhat less than the diameter of the plate 10 and of a thickness considerably less than the space between the rack 16 and the upper face of the plate 10.

The pad is adapted to be inserted beneath the rack 16 and upon the plate 10, as shown in Figure 2, so as to cover a portion of the apertures 12, with the result that the heated air currents will be diverted by the pad 21 toward the periphery of the plate 10 so that it will enter the hood adjacent the periphery of the plate and will then be directed back upon the article. The heated air will also engage the bottom of the receptacle which rests upon the rack 16 by passing over the top of the pad.

If desired an additional and similar pad 22 may be placed upon the top of the rack 16 so that the pan or receptacle will rest upon the pad 22. This pad 22 is also of a diameter considerably less than the diameter of the plate 10 and also of the rack 16.

By the use of one or both of these pads with a cooking apparatus of this character it is found that much better results will be produced than if the pads are omitted.

While the preferred form of heat distributing plate and of the pads has been herein shown and described, it is to be understood that various changes may be made in the details of construction and in the combination and arrangement of the several parts, within the scope of the claims, without departing from the spirit of this invention.

What is claimed as new is:—

1. A cooking apparatus embodying a heat distributor plate having a depending peripheral flange and provided with apertures throughout the area of the body of the plate, a hood adapted to be removably supported over the plate, and an independent sheet of heat non-conducting material adapted to be removably placed directly upon said plate to cover a portion of the apertures in the plate to form a closure therefor and for directing the heat towards the periphery of the plate.

2. A cooking apparatus embodying a heat distributor plate having apertures therethrough, said plate adapted to be placed over a flame, an article supporting rack resting upon and spaced from said plate, an independent sheet of heat non-conducting material of a diameter considerably less than the diameter of the plate adapted to be placed between the rack and plate and directly upon the plate to cover a portion of the apertures in the plate to form a closure therefor for directing the heat towards the periphery of the plate, said sheet being freely removable and replaceable, and a hood adapted to enclose the rack and said sheet.

3. A cooking apparatus embodying a heat distributor plate having apertures therethrough, said plate adapted to be placed over a flame, an article supporting rack resting upon and spaced above said plate, an independent sheet of heat non-conducting material of a diameter considerably less than the diameter of the plate adapted to be placed between the rack and plate and directly upon the plate to cover a portion of the apertures in the plate for directing the heat towards the periphery of the plate, said sheet being freely removable and replaceable, an additional sheet of non-conducting material of a diameter considerably less than the diameter of said rack and adapted to removably rest upon the rack, and a hood adapted to enclose the rack and said sheets.

4. A cooking apparatus embodying a heat distributor plate having apertures therethrough, said plate adapted to be placed over a flame, an article supporting rack resting upon and spaced above said plate, an independent sheet of heat non-conducting material of a diameter considerably less than the diameter of the plate adapted to be placed between the rack and plate and directly upon the plate to cover a portion of the apertures in the plate for directing the heat towards the periphery of the plate, said sheet being freely removable and replaceable, and an additional sheet of non-conducting material of a diameter considerably less than the diameter of said rack and adapted to removably rest upon the rack.

In testimony whereof I have signed my name to this specification, on this 26th day of October, A. D. 1927.

STANLEY SAUVAGE.